F. KOEPE.
Elevator.
No. 206,251. Patented July 23, 1878.
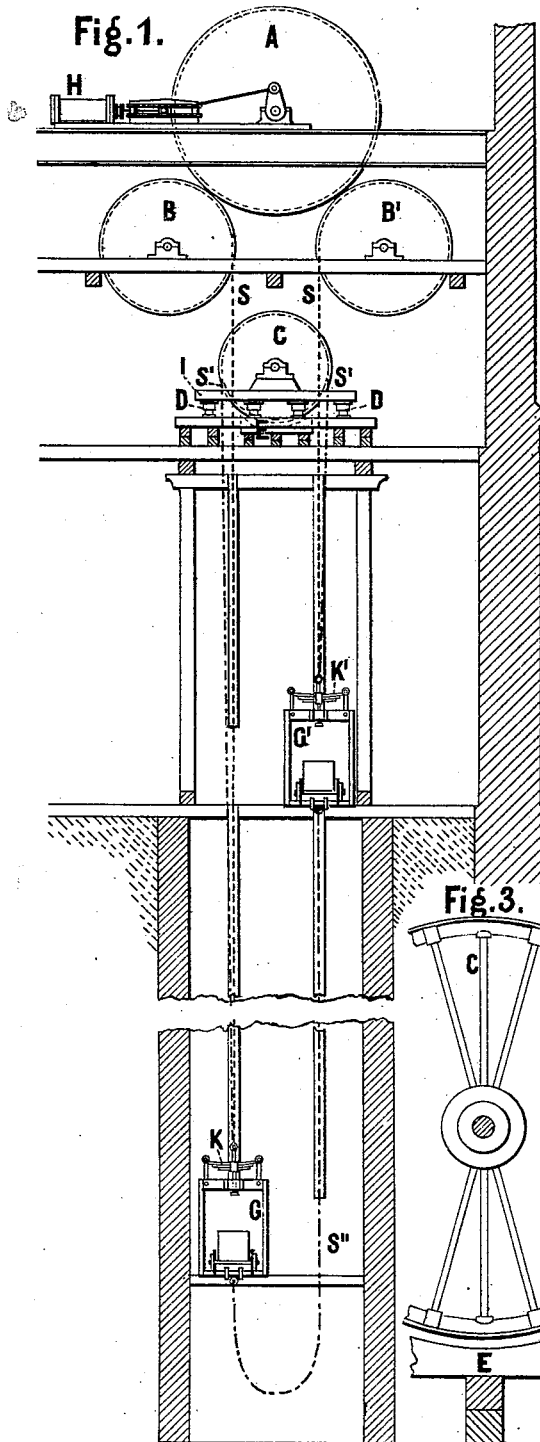
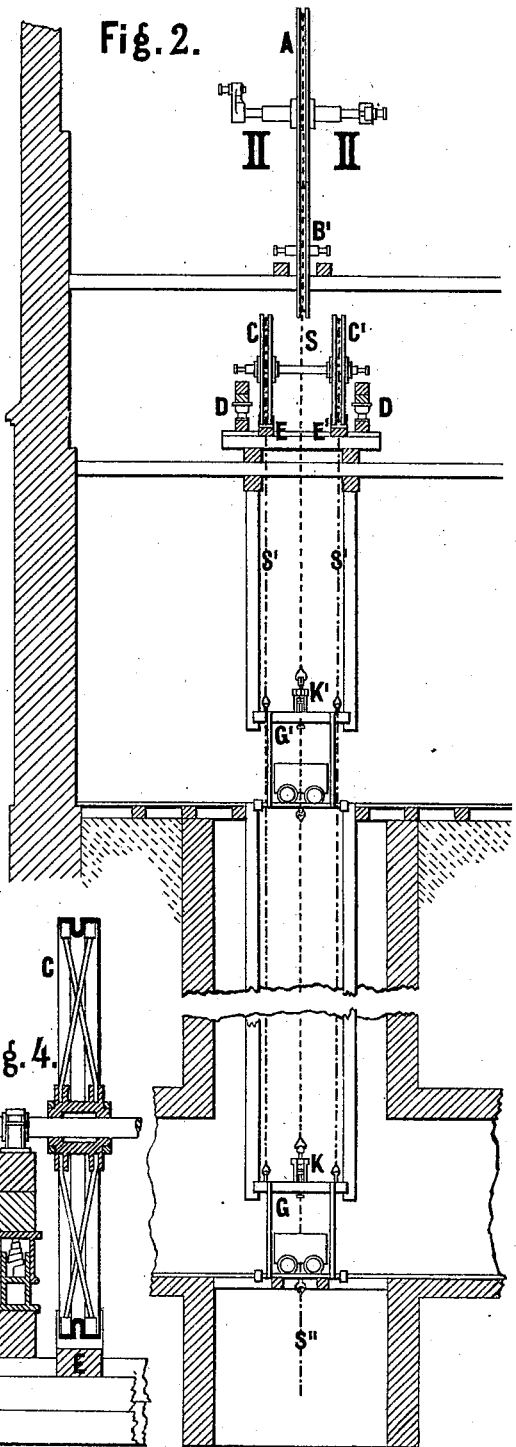
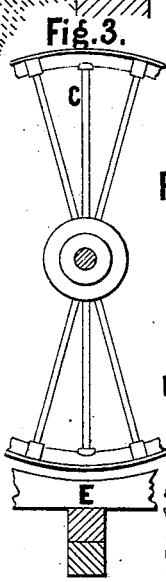
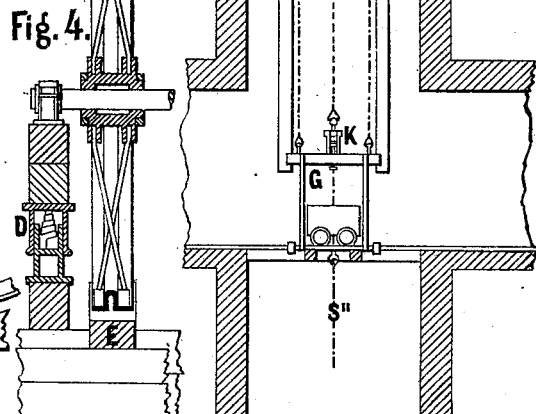
Friedrick Koepe, Inventor

UNITED STATES PATENT OFFICE.

FRIEDRICH KOEPE, OF BOCHUM, PRUSSIA.

IMPROVEMENT IN ELEVATORS.

Specification forming part of Letters Patent No. 206,251, dated July 23, 1878; application filed June 24, 1878; patented in Germany, August 1, 1877; in England, November 19, 1877; in Belgium, October 31, 1877; in France, November 2, 1877; and in Austria, October 26, 1877.

*To all whom it may concern:*

Be it known that I, FRIEDRICH KOEPE, of Zeche, Hannover, near Bochum, Prussia, have invented certain Improvements in Winding Gear and Safety Apparatus for Mines, of which the following is a specification:

The object of this invention is to simplify and improve the arrangement of the winding-drum, and in combination with such improvement to provide for an efficient safety apparatus, to balance the weight of the rope, and to prevent the cages from being lifted too high.

The two drums and the overhead pulleys of the ordinary winding arrangement are, in this case, replaced by a single pulley having a groove on its periphery. This pulley is keyed on the shaft of the winding-engine or otherwise driven by the same, and is placed over the working-pit. The winding-rope, which is simply hung over the said pulley, so as to encircle only its top part, is actuated by friction alone. If the pulley is larger than the distance between the centers of the two divisions of the pit, suitable guide-pulleys have to be employed.

On the accompanying drawing, this arrangement of winding-gear is represented by Figure 1 in a front view, and by Fig. 2 in a side elevation. The Figs. 3 and 4 show details to a larger scale.

A is the winding-pulley, over which the winding-rope S is hung, the said pulley being driven by an engine, H. B B' are the guide-pulleys, serving to keep at the required distance apart from each other the two parts of the rope S attached to the cages G and G'.

It will be seen that by this arrangement the load on the ascending cage is lifted by the friction between the rope S and the periphery of the winding-pulley A. If the distance between the center lines of the two parts of the winding-shaft is made equal to the diameter of the pulley A, the guide-pulleys B B' may be dispensed with. The length of the rope must, of course, be adjusted in such a manner that when one cage has arrived at the bottom of the pit the other is on a level with the bank at the pit-mouth.

The safety apparatus is arranged in the following manner: Below the winding-pulley A a shaft is placed carrying two other grooved pulleys, C and C', (see also Figs. 3 and 4,) over which are passed the auxiliary ropes S' S', attached, with their ends, to the hoisting-cages. The bearings of the said shaft are fixed on beams T, supported by a number of springs, D, inclosed in suitable casings. Supposing the tension of the auxiliary ropes S' to be regulated in such a manner that the springs D bear a part of the weight of the cages, &c., and a breakage of the winding-rope occurring, the cages will be held by the ropes S', and their whole weight, as also the weight of the load, will be thrown on the springs D, which are thereby compressed. The pulleys C C', over which the ropes S' run, are consequently drawn down to a certain amount, and their rims brought into contact with the fixed brake-blocks E E', so that friction ensues, which causes the pulleys C C', and also the cages, to be stopped.

By preference, one of the pulleys C C' is keyed on its shaft, while the other is loose on the same. This arrangement has been adopted to make up for any inequality in the diameter of the two pulleys and to prevent an injurious slipping of either of the ropes. The pulleys C C' are provided with broad rims suitable for being acted upon by the brake-blocks E E'.

It may be observed that the idea from which this safety arrangement originated is not altogether new, but its practical application was hitherto impossible, as with the common hoisting-gear the cages do not, at all points of their course run the same distance in the same periods of time. This, however, is the case with the present arrangement, and it is necessary that this condition be fulfilled for the purpose of causing the tension of the safety-ropes to be unvarying.

For the purpose of balancing the weight of the winding-rope S and of the auxiliary or safety-ropes S' S', a rope, S'', having the weight of the three ropes S S' S' together, is attached with its ends to the under side of the cages, while its bight is at the bottom of the mine. The total weight of the ropes on one side of the winding-pulley is thus balanced by their weight on the other side, at whichsoever point of the pit the cages may be.

The cages are prevented from being lifted too high by regulating the tension of the auxiliary or safety ropes S' S' in such a manner that the friction between the winding-pulley A and the main rope S is just sufficient to raise a loaded cage, while the empty cage is suspended by the descending part of the rope.

When, under these conditions, the empty cage settles on the supports provided for the purpose at the bottom of the pit, its weight is taken off from the winding-rope, whereby the friction on the winding-pulley is decreased, so that it slips under the rope without raising any farther the loaded cage. In consequence, even if the engine should not be stopped in due time, no accident from this cause can take place. As soon, however, as the motion of the engine is reversed, there will be again the necessary friction between rope and pulley for raising the load, which is now on the other cage.

In the ordinary arrangement of hoisting-gear it is usual to secure the cage at the pit-mouth by means of palls catching under the same. For this purpose the cage must be lifted slightly above the level of the pit-mouth or bank, and then lowered, so as to allow it to settle on the palls. With the described arrangement this, however, would be impossible; but if it is, nevertheless, desired to apply the said palls for sake of security, an attachment has yet to be provided for by which a slight extra amount of lifting is made possible. This attachment consists of a strong spring, K K', respectively, introduced between either cage and the main rope, S. While the cage is suspended by the rope the spring K is strained in proportion to the weight which it has to bear; but when the lower cage settles on its supports at the bottom of the pit the strain is more or less taken off from this spring, which, consequently, tends to reassume its normal shape, and thereby causes (in co-operation with the engine) to lift the upper cage sufficiently as to allow the palls to catch automatically, or to be brought into engagement by a hand-lever, so as to lock the cage. When the palls are to be released, the necessary amount of lifting of the cage is again effected by assistance of the spring, as in the first case.

With this arrangement the maximum power of engine may be reduced to the power necessary for lifting the neat load, while otherwise it is requisite for the purpose of lifting both cage and load above the pit-mouth to have a spare amount of power corresponding to the weight of the cage.

It may finally be observed that the hoisting-engine may, if preferred, be placed on the ground floor sideward of the pit. In this case the winding-rope has to be led over guide-pulleys arranged above the shaft.

The groove of the winding-pulley is, by preference, lined with wood or other suitable soft material for the purpose of increasing the friction and of diminishing the wear and tear of the rope.

The described winding-gear and safety apparatus is adapted for being used not only in mines, but also with elevators in store-houses, in hotels, for blast-furnaces, and for other purposes.

I claim as my invention—

1. The combination, with a winding-pulley, A, of a counterbalanced winding-rope, S, which is simply hung or passed over the said pulley and actuated by friction alone, as and for the purpose specified.

2. The combination, with the winding-pulley A and the rope S, of the pulleys C C', the springs D, the brake-blocks E E', and the auxiliary or safety ropes S' S', as described, and for the purpose set forth.

3. The combination, with the pulley A and winding-rope S and safety-ropes S' S', of the balancing-rope S'', attached with its ends to the under side of the two cages, as and for the purpose described.

4. In combination with the pulley A, winding-rope S, and cages G G', the springs K K', as specified, and for the purpose set forth.

In testimony whereof I have signed my name to this specification in the presence of two subscribing witnesses.

FRIEDRICH KOEPE.

Witnesses:
FR. AUG. HARDT,
ED. GERHARDTZ.